N. GABEL.
Churn.
No. 33,080.
Patented Aug. 20, 1861.
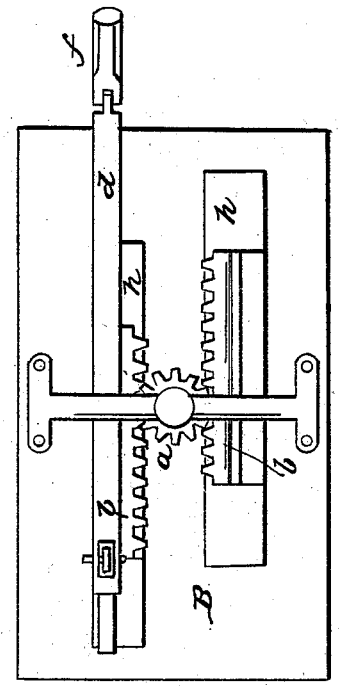
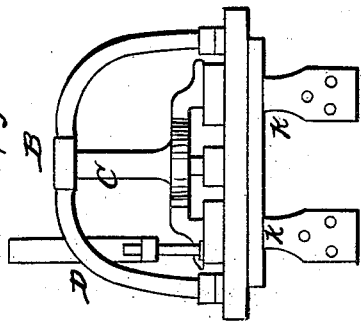
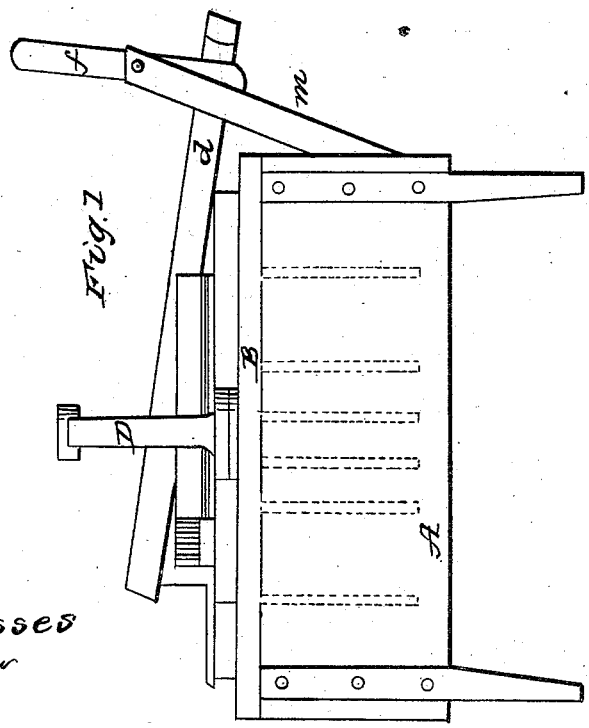

UNITED STATES PATENT OFFICE.

NELSON GABEL, OF GRATIS, OHIO.

CHURN.

Specification of Letters Patent No. 33,080, dated August 20, 1861.

*To all whom it may concern:*

Be it known that I, NELSON GABEL, of Gratis, in the county of Preble and State of Ohio, have invented certain new and useful Improvements in Churns; and I do hereby declare that the following is a full, clear, and exact description of the same, reference being had to accompanying drawings, and to the letters of reference marked thereon, in which—

Figure 1 represents a longitudinal section, Fig. 2 a plan of the top, and Fig. 3 a vertical section showing the dashers.

The nature of my invention consists in giving the dashers a reverse reciprocating motion by the employment of racks and pinion. Also the same in combination with such other devices as will be hereinafter fully set forth.

To enable others skilled in the art to make and use my invention I will now describe its construction and operation.

(A) represents a box of suitable dimensions which of course must be constructed as tight as its object requires.

(B) is the top fitting perfectly over the mouth of box (A). Said top is provided with two slots or mortises over which the slides ($h\ h$) are placed.

($k\ k$) are the dashers, which extend through the slots and are firmly secured to the slides ($h\ h$) as fully shown. It should be observed that I attach three dashers to each slide, the end ones being provided with three or more holes as shown in Fig. 3, while the middle ones have none.

($b\ b$) are racks secured to slides ($h\ h$) and ($a$) a pinion placed between the racks ($b\ b$) on the vertical shaft (C). Said shaft has a bearing on the top (B) and is supported by means of the curved piece of metal (D) as fully represented in Figs. 1 and 3.

($d$) is a lever attached to one of the slides.

($m$) is a standard and ($f$) is a lever, which is pivoted between the forks of standard ($m$). The lower end of lever ($f$) is pivoted to lever ($d$) as seen in Fig. 1. Thus it will be observed that when milk is put into the box and the lever ($a$) worked to and fro the agitation of the milk will be very great. As the currents each way will be broken and dashed in opposite directions the globules will thus be crushed both by sudden concussion against the side of the box and the violent reverse action of the currents.

Having thus fully described my invention what I claim and desire to secure by Letters Patent is—

The employment and arrangement of fixed pinion ($a$), double reciprocating racks ($b\ b$) and slides ($h\ h$) substantially as and for the purpose set forth.

NELSON GABEL.

Witnesses:
 O. F. EDWARDS,
 A. STIVERS.